(12) United States Patent
Blair et al.

(10) Patent No.: US 8,041,589 B1
(45) Date of Patent: Oct. 18, 2011

(54) ORGANIZATION HEALTH ANALYSIS USING REAL-TIME COMMUNICATIONS MONITORING

(75) Inventors: Colin Blair, Westleigh (AU); Kevin Chan, Ryde (AU); Christopher R. Gentle, Gladesville (AU); Neil Hepworth, Artarmon (AU); Andrew W. Lang, Epping (AU)

(73) Assignee: Avaya Inc., Basking Ridge, NJ (US)

( * ) Notice: Subject to any disclaimer, the term of this patent is extended or adjusted under 35 U.S.C. 154(b) by 1225 days.

(21) Appl. No.: 11/733,355

(22) Filed: Apr. 10, 2007

(51) Int. Cl.
*G06Q 10/00* (2006.01)
(52) U.S. Cl. .................................... 705/7.11
(58) Field of Classification Search .................. 705/7.11
See application file for complete search history.

(56) References Cited

U.S. PATENT DOCUMENTS

| | | | |
|---|---|---|---|
| 7,222,075 B2 * | 5/2007 | Petrushin | 704/270 |
| 7,346,492 B2 * | 3/2008 | Shaw | 704/9 |
| 7,624,036 B2 * | 11/2009 | Arora | 705/7.37 |
| 7,865,383 B2 * | 1/2011 | Tafoya | 705/7.36 |
| 7,869,586 B2 * | 1/2011 | Conway et al. | 379/265.06 |
| 7,870,200 B2 * | 1/2011 | Slater et al. | 709/206 |

OTHER PUBLICATIONS

Foreman, "Detection of Anger in Speech", downloaded from http://engenius.sece.rmit.edu.au/Abstracts/Page345. htm on Mar. 13, 2007, 3 pages.
Wu et al., "Emotion Recognition from Text Using Semantic Labels and Separable Mixture Models", ACM Transactions on Asian Language Information Processing, vol. 5, No. 2, Jun. 2006, pp. 165-181.
Lee et al., "An Articulatory Study of Emotional Speech Production", Speech Analysis and Interpretation Laboratory (SAIL), Viterbi School of Engineering, University of Southern California, Los Angeles, CA, USA, 2005, 4 pages.
Vogt et al., "Improving Automatic Emotion Recognition from Speech via Gender Differentiation", Proceedings of Language Resources and Evaluation Conference (LREC 2006), 4 pages.

* cited by examiner

*Primary Examiner* — Romain Jeanty
*Assistant Examiner* — George H Walker
(74) *Attorney, Agent, or Firm* — Sheridan Ross P.C.

(57) ABSTRACT

The present invention provides a communication monitoring and analysis method and system. More specifically, the present invention provides a method for determining the health and overall satisfaction of employees in an organization. The determination may be made by monitoring communications generated by employees for their tone and other parameters related to their satisfaction with various decisions made within the organization.

11 Claims, 5 Drawing Sheets

| User 408 | Job Title 412 | Employment 416 | Supervisor 420 | Average Tone 424 | Last Tone Change 428 | Data of Change 432 |
|---|---|---|---|---|---|---|
| User 1 | CEO | 1 | Board Of Directors | Supervisor: Neutral Equal: Neutral | Supervisor: Neutral Equal: Happy | June 11 |
| User 12 | Manager | 3 | Mr. Smith | Supervisor: Happy Equal: Neutral | Supervisor: Neutral Equal: Disgust | October 4 |
| User 13 | Manager | 3 | Mrs. Smith | Supervisor: Neutral Equal: Happy | Supervisor: Neutral Equal: Disgust | October 5 |
| ... | | | | | | |
| User N | Technician | 4 | User 3 | Supervisor: Anxiety Equal: Neutral | Supervisor: Neutral Equal: Happy | October 21 |

*Fig. 4*

ORGANIZATION HEALTH ANALYSIS USING REAL-TIME COMMUNICATIONS MONITORING

FIELD OF THE INVENTION

The invention relates generally to communication systems and networks. More particularly, the invention relates to communication monitoring systems and networks.

BACKGROUND

Companies and other organizations of various sizes have always been required to make policies and implement other decisions that affect the members of the organization. It is often difficult to gauge the true reaction of employees and other members of the organization to such decisions in a formal setting, namely because people tend to hide their emotions during a formal interview or when talking to a superior. Furthermore, employees may not submit responses to standard surveys or other analysis mechanisms that require user input, especially when the employees are busy with other tasks. Even when employees respond to such surveys it is difficult to ask the right questions to ascertain the health of the overall organization.

One example of employee surveys currently administered comprises a series of questions with multiple-choice answers. The questions may ask if the employee is happy with his/her current working situation, if compensation is adequate, if the employee gets along with his/her supervisor, and other direct questions. The possible answers to such questions are typically limited to yes, no, a little, a lot, and the like. Some survey questions may precipitate a certain type of response or emotional reaction from one group of employees, whereas the same survey question may precipitate a different response from another group of employees. It is hard to determine the overall satisfaction of employees with various decisions because each employee may respond differently to the same question. Also, asking an employee if they are happy or not does not tend to accurately determine if the employee is in fact happy and it further does not determine reasons behind the employee's happiness or unhappiness. In other words, the administration of surveys with direct questions cannot typically be used to gather accurate information related to an organization. Accordingly, it is difficult to construct an accurate picture of the satisfaction of employees in an organization and the overall health of the organization with current survey techniques.

SUMMARY

These and other needs are addressed by various embodiments and configurations of the present invention. The present invention is directed generally to a system, device, and method for monitoring the health and satisfaction levels within an organization or enterprise, and more particularly the employees that make up the enterprise.

In accordance with one embodiment of the present invention, a method is provided for conducting a survey about employee satisfaction (or dissatisfaction), the method generally comprising:

determining an event of interest for an enterprise;

analyzing a message originated by a user associated with the enterprise, wherein the message was generated in temporal proximity to the event of interest; and associating results of the analysis with the user's level of satisfaction (or dissatisfaction) related to the event of interest.

As used herein, a "message" comprises a unidirectional communication generated by a user. The message generally has an intended recipient or recipients, who may or may not differ from the generator of the message. That is, the message may be transmitted to another user or may be a message to one's self, such as a reminder. The generation or origination of a message may correspond to the point-in-time when the message is transmitted across a communication network. Alternatively, the generation of the message may correspond to a point-in-time when the message is prepared but prior to its transmission across the communication network.

By analyzing messages that are originated in temporal proximity to an event of interest a causal relationship between the message and the event of interest may be determined. More specifically, if a message is generated around the time that an event of interest occurs (e.g., within a couple seconds, minutes, hours, or days depending upon the magnitude of the event of interest), one can assume that the event of interest and the tone of the message have a causal relationship. Furthermore, if the message contains key words or other indicia referencing the event of interest, then a stronger causal relationship between the event of interest and the message can be assumed. This causal relationship is useful in determining how employees within an enterprise have reacted to a policy change, management change, or other type of event of interest. With the appropriate feedback, managers and other decision makers for the enterprise can better understand how their decisions affect the employees of the enterprise, which in-turn can help them manage the enterprise more effectively.

In accordance with at least some embodiments of the present invention, the analysis of the message may comprise determining a tone of the user. Determining the tone of a user may help in determining the user's emotions, which may be helpful if those emotions can be related to the event of interest. By monitoring messages generated by users in a communication network, true feelings of those users can be determined. Rather than relying upon formal questions in survey form to gather information about the health of an enterprise, one can monitor the true feelings of employees in the enterprise by analyzing real-time and non-real-time messages generated around the time of an event of interest. This helps in creating a more accurate picture of the satisfaction of employees in the enterprise as well as the overall health of the enterprise.

As used herein "user" is used to refer to any person or thing that is capable of making use of and/or interacting with a communication device and generating a message thereby.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 4 is a diagram depicting a data structure employed in accordance with embodiments of the present invention.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to monitor the overall health of an enterprise.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
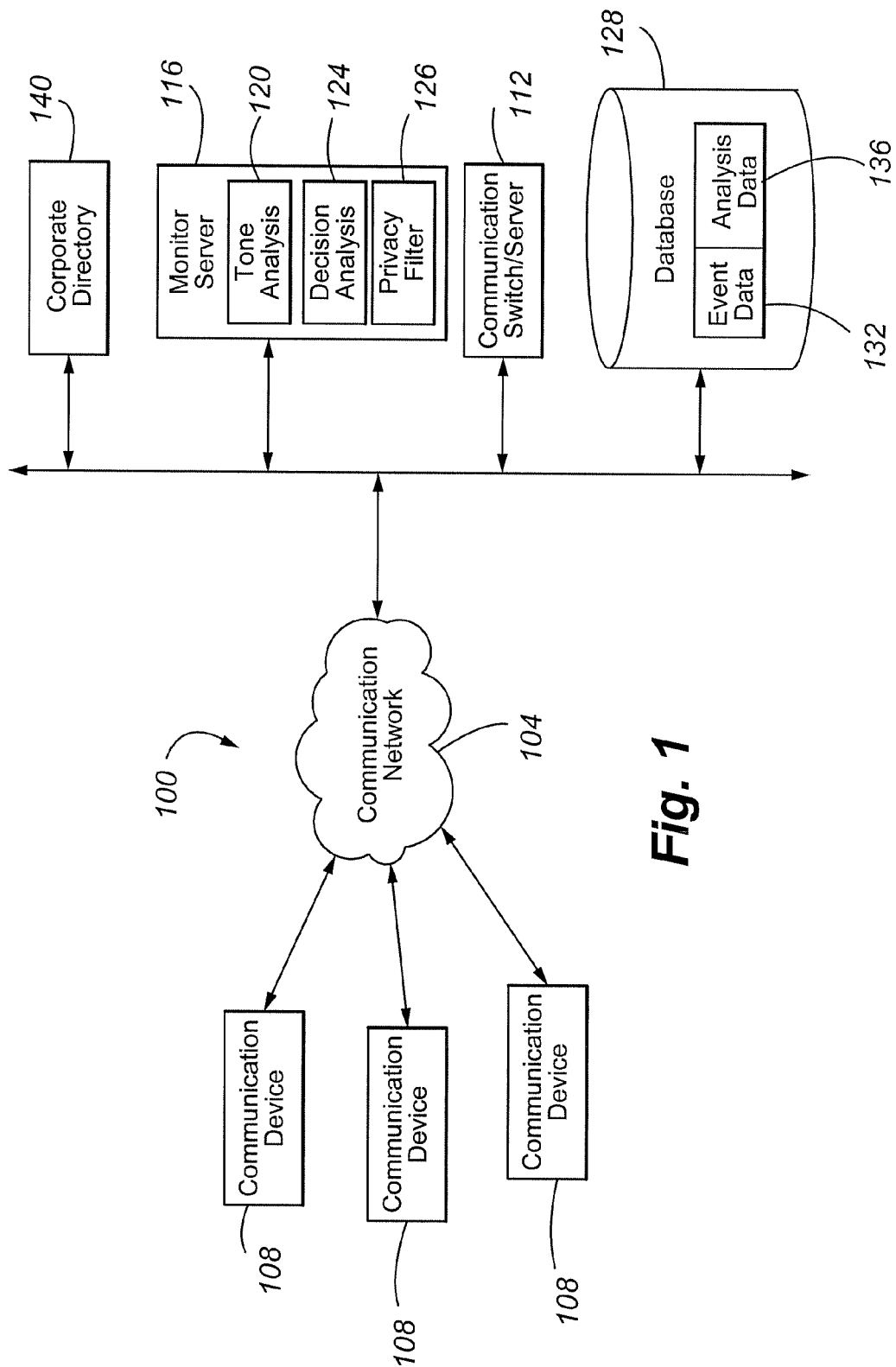
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108, a communication switch/server 112, a monitoring server 116 including a tone analysis tool 120 and a decision analysis tool 124, and a database 128 for storing event data 132 and analysis data 136.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), the Internet, and any other type of packet-switched or circuit-switched network known in the art. In addition, it can be appreciated that the communication network 104 need not be limited to any one network type, and instead may be comprised of a number of different networks and/or network types.

The communication devices 108 may be packet-switched and/or circuit-switched and can include, for example, IP phones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and the like.

The communication switch/server 112 may comprise a dedicated processor that functions to provide services to client devices (e.g., communication devices 108). The communication switch/server 112 generally enables communications between two or more communication devices 108 connected to the communication network 104. The communication switch/server 112 may comprise any type of processing medium operable to perform instructions stored on an electronic data storage area. The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

The monitoring server 116 is adapted to provide message-monitoring capabilities. The monitoring server 116 is characterized by the ability to monitor and analyze messages transmitted across the communication network 104 in order to determine the health of an enterprise or the satisfaction of employees within the enterprise. In accordance with at least one embodiment of the present invention, the monitoring server 116 is adapted to monitor messages transmitted from one communication device 108 to another communication device 108, either upon transmission of such messages by the transmitting communication device 108, upon receipt of such message by the receiving communication device 108, or during storage of the message on the communication switch/server 112 or an associated data storage area. The monitoring server 116 may monitor both real-time messages (e.g., messages generated during a phone conversation or during a chat session) and non-real-time messages (e.g., email messages or voice recordings). The monitoring server 116 may recover such messages from the communication switch/server 112 or from the communication devices 108 upon issuance of a request for the message.

In accordance with one embodiment of the present invention, the monitoring server 116 receives operational instructions from one or more designated communication devices 108. For instance, a user of a communication device may engage the communication device 108 to issue a request that the monitoring server 116 gather and analyze messages generated during a certain period of time. Upon receipt of the request, the monitoring server 116 may employ the tone analysis tool 120 to determine the tone of the message, or more particularly the tone of the user that generated the message. In determining the tone, the tone analysis tool 120 may identify one or more emotions of the user though emotion recognition techniques known in the art.

Wu et al. describe one example of an emotion recognition model in an ACM transaction entitled, "Emotion Recognition from Text Using Semantic Labels and Separable Mixture Models", the entire disclosure of which is hereby incorporated herein by reference. This particular publication presents a text-based emotion recognition approach that uses emotion generation rules to represent the conditions for generating emotions. Based on those rules, the emotional state of each sentence can be represented as a sequence of semantic labels and attributes, which in turn are represented by emotion association rules. Finally, a separable mixture model is used to estimate the similarity between an input sentence and the emotion association rules of each sentence to determine an emotion for the sentence and the overall message. The model described in the Wu publication is useful in that it analyzes semantic information as well as syntactic information in the text.

Vogt et al. describe another emotion recognition model entitled, "Improving Automatic Emotion Recognition from Speech via Gender Differentiation", the entire disclosure of which is hereby incorporated herein by reference. This publication describes a speech-based emotion recognition approach that examines patterns in the pitch (or frequency), energy (or amplitude), audible segment duration, and pause duration in the speech. Based on the examination the emotions of the speaker can be estimated with a reasonable degree of certainty.

The tone analysis tool 120 may be adapted to analyze text, audio, and/or video messages for emotions. The tone analysis tool 120 may analyze a number of different parameters of the message to determine the emotion or emotions associated with the message. For instance, in a text-based message, the tone analysis tool 120 may consider semantic information, syntactic information, key words, punctuation, capitalization, and whether the user is writing in the active-voice or passive-voice. Typically an active-voice is associated with stronger emotions or tones whereas a passive-voice is associated with a neutral emotion or tone. In an audio message the tone analysis tool 120 may examine the pitch, energy, audible segment duration, pause duration, and patterns associated therewith to determine the tone or emotion associated with the message. In a video message the tone analysis tool 120 may compare various frames of the video message to determine the motions of the speaker's face while talking. The changes in the facial expressions of the speaker may provide an indication of the speaker's emotion or tone.

Examples of emotions that may be identified by the tone analysis tool 120 include a neutral tone, an angry tone, a bored tone, a disgusted tone, an anxious or fearful tone, a happy tone, and a sad tone. Where a happy tone is generally considered more positive than a neutral tone, which in turn is considered more positive than a bored, sad, anxious, or disgusted tone, all of which are considered more positive than an angry tone. The tone analysis tool 120 may also be adapted to differentiate messages and tones based on the hierarchical relationship between the transmitter and recipient.

The monitoring server 116 may further be provided with the decision analysis tool 124 that is adapted to compile the analysis results from the tone analysis tool 120 and determine the overall health of the enterprise. In accordance with at least one embodiment of the present invention, the decision analysis tool 124 is characterized by the ability to compare the transmission times of the analyzed messages with a time corresponding to the occurrence of an event of interest. The decision analysis tool 124 is adapted to determine whether there is a causal relationship between the event of interest and the tone of employees within the enterprise. Furthermore, the decision analysis tool 124 may be capable of correlating and determining an average emotion or tone for an entire level of employees within the enterprise. Accordingly, the decision analysis tool 124 may be able to generate a report for a requesting user that identifies when a particular event of interest occurred and what the reaction to that particular event was.

The monitoring server 116 may generate such reports based on historical data that is maintained in the database 128. In accordance with one embodiment of the present invention, the monitoring server 116 retrieves data from the database 128 related to historical tone trends as well as average employee tones and compares those tones to tones of employees just after an event of interest. The event data 132 may be retrieved from the database 128 and after the monitoring server 116 has performed the necessary analysis, the analysis results may be transmitted to the user in the form of a report. Additionally, the analysis results may be stored as analysis data 136 for use during the analysis of subsequent events of interest.

In accordance with one embodiment of the present invention, the monitoring server 116 may continuously monitor messages in response to receiving a request for the determination of the health of the enterprise. In such an embodiment, a request for monitoring may be received just prior to an event of interest or just after an event of interest and all subsequently transmitted messages may be analyzed for a predetermined period of time (e.g., a few hours, days, weeks, or months). The length of time for which messages may be monitored may vary depending upon the magnitude of the event of interest or based upon predefined user preferences. In an alternative embodiment, the monitoring server 116 may continuously monitor messages and upon receipt of a request to determine the health of an enterprise, the monitoring server 116 may access historical records of messages generated within a predetermined time of the event of interest. Additionally, the act of continuously monitoring messages can help to determine an average tone of employees in the enterprise in the absence of events. This average tone may be used as a baseline for comparing tones of messages that are generated in temporal proximity to an event of interest. Such a comparison may help determine whether there was any change in employee emotion as a result of the event of interest. In an alternative embodiment, a sampling approach may be utilized to reduce the amount of resources required by the server 116. A small proportion of overall traffic in the communication network 104 may be analyzed to infer the overall health of the enterprise.

In accordance with one embodiment, and in consideration of privacy concerns, the monitoring server 116 acts as an analysis agent and is the only device other than the transmitting communication device 108, recipient communication device 108, and communication switch/server 112 that has access to the contents of raw messages transmitted across the communication network 104. Namely, other communication devices 108 requesting a report about the health of an enterprise may only receive results of the analysis from the monitoring server 116. In order to facilitate such privacy requirements, the monitoring server 116 may be provided with a privacy filter 126 that filters the type of data provided to other users in a report. The monitoring server 116 may be capable of searching keywords and other intimate details of messages, but the report generated by the monitoring server 116 may only report general statistics about a message or messages.

The requesting communication device 108 is typically not allowed access to message itself but rather is only allowed to view results of the analysis of the message. It follows that the monitoring server 116 acts as a barrier between the requesting communication device 108 and possibly private communications between enterprise employees or other users associated with the enterprise.

The monitoring server 116 may also be in communication with a corporate directory 140. The corporate directory 140 may comprise a server, database, or both. The corporate directory 140 may allow the partitioning of analyzed data along corporate structures. For example, the monitoring server 116 may use the hierarchy and organizational relationships provided by the corporate directory to categorize enterprise health data.

It should be emphasized that the configuration of the servers 112, 116, user communication devices 108, and other elements as shown in FIG. 1 is for purposes of illustration only and should not be construed as limiting the invention to any particular arrangement of elements.

Figure 2:
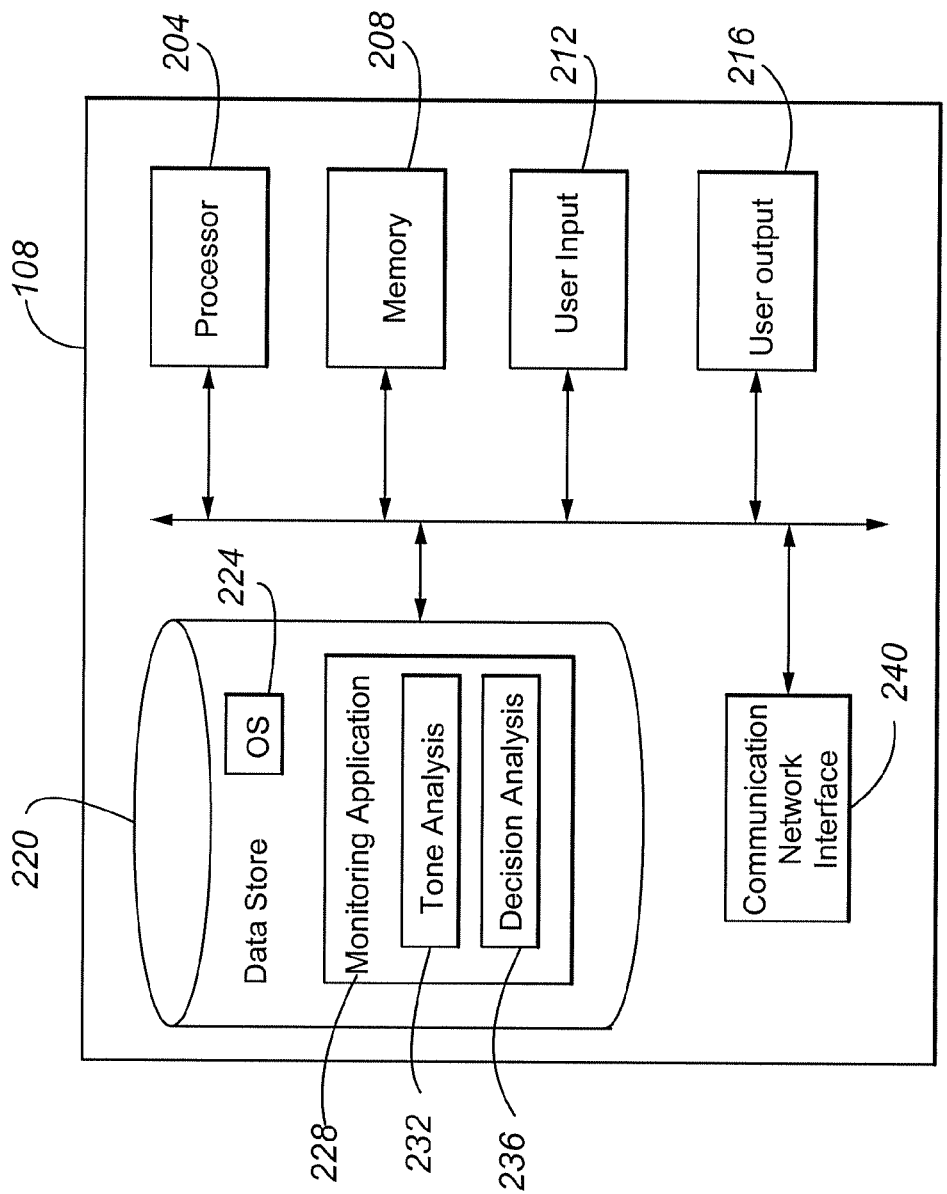
FIG. 2 is a block diagram depicting a communication device in accordance with embodiments of the present invention.

With reference now to FIG. 2, components of a communication device 108, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include a monitoring application 228 that provides functionality similar to the monitoring server 116 described in relation to FIG. 1. The monitoring application 228 resident on the communication device 108 may provide the ability to locally analyze messages transmitted by a particular user for the tone of the user. After determining the tone of a user, the monitoring application 228 may send results of the analysis either to the database 128 for storage or to the monitoring server 116 where it can be included in a status report or incorporated into an aggregate of the enterprise's reaction to a particular event of interest. Alternatively, the tone of the user may be incorporated into a report identifying the overall health of the enterprise as it relates to employee morale.

To accomplish the various tasks associated with analyzing a message for its tone the monitoring application 228 may be provided with a tone analysis tool 232. The tone analysis tool 232 may analyze various messages parameters that may provide an indication of the user's tone. The tone analysis tool 232 may analyze parameters similar to those described in relation to the tone analysis tool 120 provided on the monitoring server 116. Furthermore, the monitoring application 228 may be provided with a decision analysis tool 236 to determine the user's reaction to a particular event of interest. By providing the communication device 108 with the monitoring application 228, the analysis of tone and determination of a reaction to an event of interest may be distributed throughout the communication system 100. This can help reduce the processing requirements on the monitoring server 116 or obviate the need for the monitoring server 116 altogether. Furthermore, if the communication device 108 responsible for generating and transmitting a particular message is also responsible for analyzing that message for tone, then the security of the message maintained and employees may be more likely to show their true emotions during conversations with other individuals.

The data storage 220 may also contain application programming and data used in connection with the performance of other functions of the communication device 108. For example, in connection with a communication device 108 such as a telephone or IP telephone, the data storage 220 may include communication application software. As another example, a communication device 108 such as a Personal Digital Assistant (PDA) or a general-purpose computer may include a word processing application in the data storage 220. Also, a communication device 108 such as a portable music/video storage and playback device may include applications related to the playback of various stored content.

A communication device 108 may also include one or more communication network interfaces 240. Examples of communication network interfaces 240 include, but are not limited to, a network interface card, a modem, a wired telephony port, a serial or parallel data port, radio frequency broadcast transceiver, a USB port, or other wired or wireless communication network interfaces.

Figure 3:
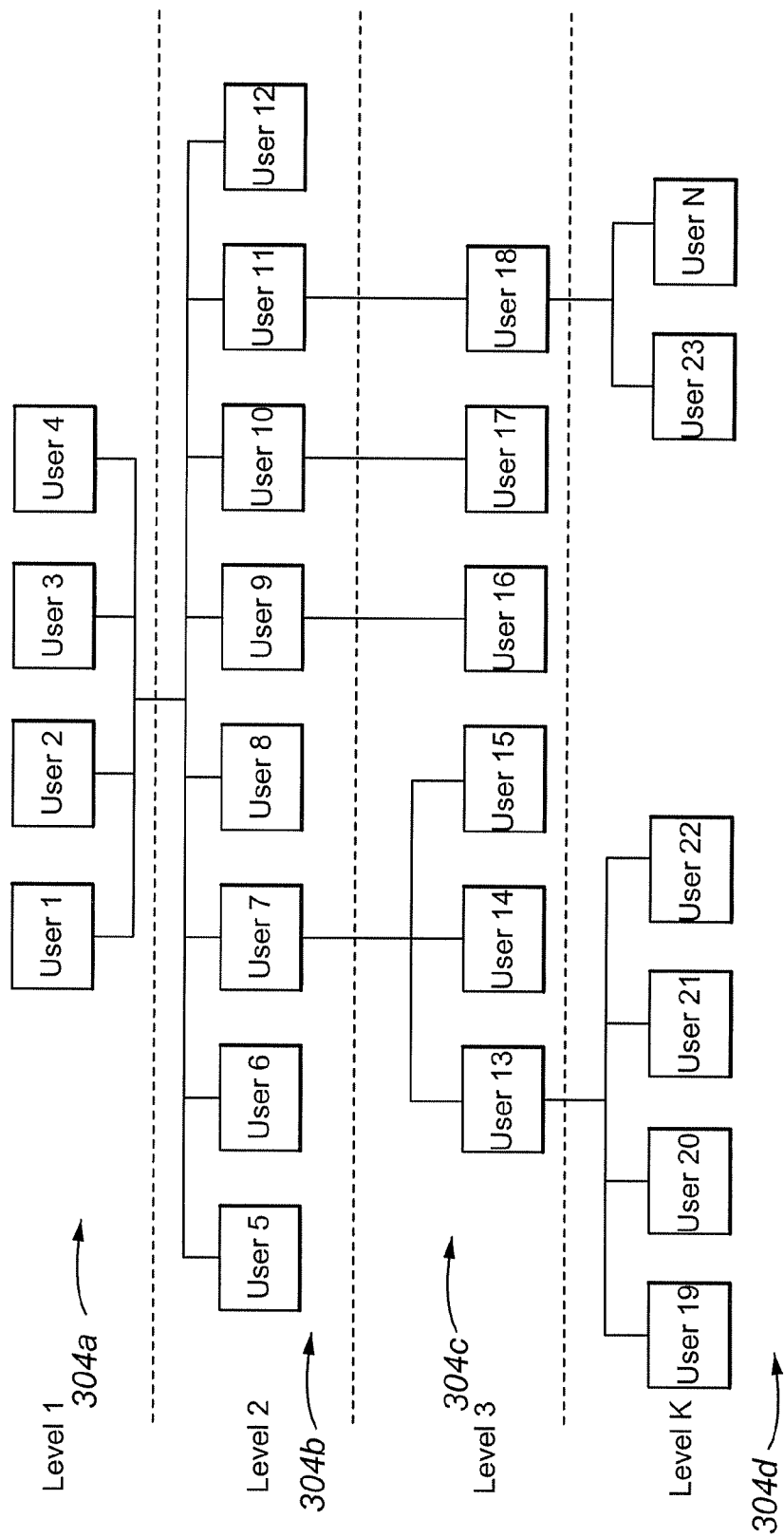
FIG. 3 is a block diagram depicting an enterprise hierarchical structure in accordance with embodiments of the present invention.

With reference now to FIG. 3, an exemplary enterprise hierarchical structure will be described in accordance with at least some embodiments of the present invention. As noted above, the tone analysis tool 120, 232 may be adapted to differentiate messages based on the hierarchical relationship between the message sender and the message recipient. Most enterprises are organized into one or more hierarchical levels, where people in certain levels are required to report to people in higher levels.

The hierarchical structure of an enterprise is interesting in that employees in a common hierarchical level tend to speak and communicate with one another more openly as compared to employees in different hierarchical levels. For instance, management level employees may speak very plainly about their feelings and reactions to a particular policy decision among each other but they may maintain a more professional and neutral tone when speaking with an employee in a different hierarchical level. Accordingly, it may be easier to determine an employee's true tone and emotion from messages that are transmitted to another employee in the same hierarchical level as the sending employee. Conversely, if a change in tone is noticed for communications between hierarchical levels, an assumption may be made that the tone of the employee is very serious, since a neutral tone between hierarchical levels is typically expected.

In accordance with one embodiment of the present invention, an enterprise may comprise four hierarchical levels 304a-d. Although depicted with four hierarchical levels, it can be appreciated that an enterprise may have any where between one and hundreds of hierarchical levels, depending upon the size of the enterprise. Furthermore, the organization of various enterprises may not necessarily reflect that of the enterprise depicted in FIG. 3. As can be appreciated, other enterprises may comprise a single level, more of a mesh type, hierarchical structure rather than a tree type structure. Employees at the first level 304a may be executive level employees or the like that are responsible for making policy decisions related to the enterprise. The second level 304b may comprise high level managers and the like that all directly report to one or all of the employees at the first level 304a. Likewise, employees at the third level 304c may report directly to one employee at the second level 304b. Also, employees at the third level 304c may have a number of employees reporting to them from the fourth level 304d.

FIG. 4 depicts a data structure 404 that may be employed to determine the overall health of an enterprise. In accordance with one embodiment of the present invention, the data structure 404 may comprise a user field 408, a job title field 412, an employment level field 416, a supervisor field 420, an average tone field 424, a last tone change field 428, and a date of change field 432. User identification numbers or names for each employee or user associated with an enterprise may populate the user field 408. Of course, the user field 408 may also be populated by a collection of users, for example from the same enterprise level 304. In other words, the data structure 404 may be used to track the average tone of an enterprise level 304 rather than individual users within the enterprise.

The job title field 412 may comprise data related to the user's employment title. This data helps to quickly identify a user's actual status and function within an enterprise. Moreover, in the event that the enterprise is not organized into hierarchical levels the job title information may be used to determine if users are communicating with someone that has a similar job title or function or if the users have different functions within the enterprise.

The employment level field 416 may comprise a numerical indicator of the employee's position within the enterprise hierarchy. The employment level numbers assigned to each employee may correspond to the hierarchical level to which the employee belongs. For example, if the employee is in the first level of the hierarchy, then that employee may be assigned an employment level of one. Alternatively, the employee may be assigned an employment level number that is higher than all other employment level numbers.

The supervisor field 420 may be utilized to store data related the user's supervisor or supervisors. It may be useful to identify the supervisor of an employee so that messages from the employee to the supervisor can be marked as a message between hierarchical levels. Furthermore, it may be useful to know the identity of the supervisor of an employee or group of employees to monitor the performance of the supervisor. For example, if a number of the employees working for a particular supervisor have relatively positive tones when communicating with one another or even when communicating with the supervisor, then an assumption can be made that the supervisor is taking the necessary steps to keep the employees happy. On the other hand, if a number of employees working for the same supervisor tend to have negative tones when sending messages, then further investigation may be warranted for the situation because that supervisor's employees appear to be unhappy, possibly with their supervisor or because of some other event of interest that commonly effects those employees.

The average tone field 424 may comprise data relating to the user's average tone. The average tone field 424 may also be capable of storing data for the user's average tone based on the recipient of the user's messages. For example, the user may tend to have a relatively positive or neutral tone with his/her supervisor whereas the same user may tend to have a less positive tone in messages sent to other users in the same hierarchical level. The average tone of messages sent to the same hierarchical level be a more accurate reflection of the user's emotions that the tone that is used in messages to a supervisor. In addition to the user's average tone, the average tone field 424 may comprise data related to the minimum and maximum happiness or other emotions for a particular user or even a historical list of discrete tones for a particular user.

In addition to maintaining data related to the user's average tone, the last tone change field 428 may store data related to changes in the user's tone, typically as compared to the user's average tone. Maintaining records about when a user has changed his/her tone can be useful when a historical report about the health of an enterprise is requested. By knowing when a certain user has changed their tone, a comparison to certain events of interest can be made to determine if the event of interest was a potential cause of the change in tone. Furthermore, the date of the most recent change in tone may be maintained in the date of change field 432. This date can be compared to the time when an event of interest occurred. Although the date in the date of change field 432 is only depicted as having a granularity of a day, one skilled in the art will appreciate that the date of change may be as granular as a couple of minutes or seconds when the change occurred. In accordance with one embodiment, the date of change field 432 may actually be populated with the time that a message was generated that showed a change in the user's tone. Still further in the alternative, the actual message may be stored in the date of change field 432.

Figure 5:
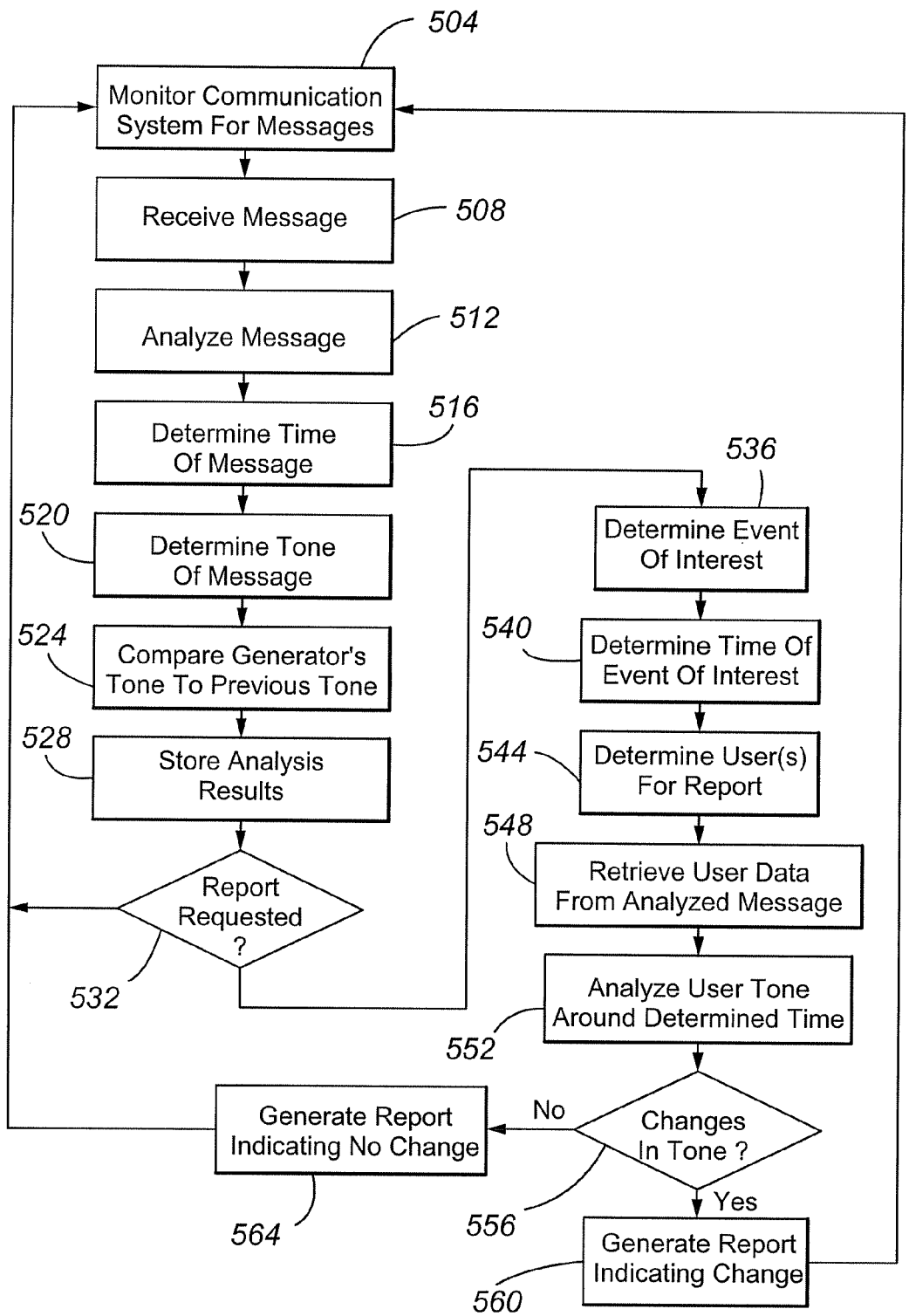
FIG. 5 is a flow diagram depicting a method of creating monitoring the health of an enterprise in accordance with embodiments of the present invention.

With reference now to FIG. 5, a method of determining the overall health of an enterprise will be described in accordance with at least some embodiments of the present invention. Initially, communications within the communication system 100 are monitored by the monitoring server or application 116, 228 (step 504). As communications are monitored, the tone analysis tool 120, 232 waits until a message is received (step 508). The message is generally received just after it has been generated, where the generation of the message often corresponds to the point-in-time when the message is transmitted across the communication network 104. Alternatively, the generation of the message may correspond to the point-in-time when the message is prepared but prior to transmission across the communication network 104.

Upon receiving the message, the tone analysis tool 120, 232 analyzes the message for various parameters that may be used to determine the overall health of the enterprise (step 512). As a first part of the analysis, the tone analysis tool 120, 232 may determine when the message was generated (step 516). In addition to determining when the message was generated, the tone analysis tool 120, 232 determines the tone of the message generator (step 520). During this determination, the tone analysis tool 120, 232 may first determine the identity of the user that generated the message as well as the intended recipient(s) of the message. This determination allows the tone analysis tool 120, 232 to determine what relational category the message falls into (i.e., intra-level message or inter-level message). The tone analysis tool 120, 232 differentiates between intra-level messages and inter-level messages because often an employee will have two different tones depending upon whom they are talking to, even on the same day.

In addition to determining the relationship between the message generator and the message recipient, the tone analysis tool 120, 232 also determines the tone of the message, which may provide an indication of the emotion of the person generating the message. In accordance with at least one embodiment of the present invention, the tone analysis tool 120, 232 is adapted to analyze at least one of an audio message, text message, and video message for the tone of the generator. Various parameters of the message can be analyzed, depending upon the message medium. For example, in a text-based message, the tone analysis tool 120, 232 may analyze key words, frequency of use of certain words, the message semantics, the message syntax, whether active or passive-voice is used, capitalization, punctuation, and so on. On the other hand, in a speech message, the tone analysis tool 120, 232 may analyze the patterns in pitch, amplitude, segment duration, and pause duration for the message. Of course, the speech message may also be converted to a text-based message and other textual components of the message may be analyzed in addition to the speech-based components. Furthermore, in a video message, the tone analysis tool 120, 232 may examine the facial movements and other actions of the generator of the message to try and deduce the tone of the user. The categories of tones that may be identified by the tone analysis tool 120, 232 include, but are not limited to, neutral, anger, boredom, disgust, anxiety/fear, happiness, and sadness.

Once the tone analysis tool 120, 232 has identified the tone of the message, the tone analysis tool compares the generator's tone in the current message to the generator's tone from previous messages (step 524). This may be based on the hierarchical relationship between the message generator and the message recipient. For instance, the tone analysis tool 120, 232 may compare the current tone to previous tones of messages sent to users in the same hierarchical level but not to previous tones of messages sent to users in different hierarchical levels. Alternatively, if the current message is to a user in a different hierarchical level, the tone analysis tool 120, 232 may compare the generator's tone to his/her tone in other messages to users in a different hierarchical level. Of course, the tone analysis tool 120, 232 may simply choose to compare the generator's tone to his average tone or to the average tone of a group of employees. By comparing the tone difference between the current message and any previous messages the tone analysis tool 120, 232 is able to determine if there has been a change in the generator's tone. If such a determination is made, the tone analysis tool 120, 232 may make a note indicating the change in tone.

After the tone has been determined, the tone analysis tool 120, 232 may store the analysis results in a proper storage medium, such as the database 128 or in a local data store 220 (step 528). When the tone analysis results have been stored, it is determined if a report has been requested (step 532). Often times a report will be requested for historical tone analysis data as compared to an event of interest that has previously occurred. On the other hand, sometimes a request for a report may prompt the tone analysis tool 120, 232 to begin analyzing messages for the generator's tone. In the event that a report has not been requested, then the method returns back to step 504 where the communications in the communication system 100 are monitored for additional messages.

However, if a report has been requested, then the method continues to determine an event of interest (step 536). An event of interest may be identified historically by identifying a certain period in time or identifying an action that occurred at some point in the past (step 540). Alternatively, an event of interest may be identified prior to its occurrence. For instance, if a manager knows that a policy decision will soon be implemented, then the manager may request the monitoring and eventual preparation of a report for messages sent after the policy decision is implemented.

Once the time corresponding to the event of interest has been determined, the user(s) that will be included in the report are determined (step 544). The report may be generated for a single user to see a particular reaction to an event or interest or the report may be generated for a group of users to see the collective reaction to the event of interest. The group of users may correspond to employees having a common characteristic, for example employees within the same hierarchical level or employees that report to the same supervisor.

The decision analysis tool 124, 236 then retrieves the selected employees' tone data from the database 128 or other area where it is stored (step 548). Upon retrieving the required data, the decision analysis tool 124, 236 analyzes each user's tone, and more specifically their change in tone, around the determined time (step 552). In this step, the decision analysis tool 124, 236 may analyze the times of various tone changes and determine if any user's had a change in tone around the time the event of interest occurred. Alternatively, the decision analysis tool 124, 236 may select certain messages that were generated around the time the event of interest occurred to determine what sort of tone the users had in generating the message.

Based on that analysis, the decision analysis tool 124, 236 determines if there was a change in tone around the time that the event of interest occurred (step 556). For instance, the decision analysis tool 124, 236 may analyze whether a user or collection of users had their tone change within a predetermined time of an event of interest. If such a tone change was detected within the predetermined time, then the decision analysis tool 124, 236 may generate a survey report indicating the change in tone and its possible connection to the event of interest. The decision analysis tool 124, 236 may estimate the degree of causation between the event of interest and the change in tone based on key words used in various messages and the amount of time between the generation of the message and the event of interest. For example, if the message contains various words related to the event of interest, then the decision analysis tool 124, 236 may determine to a greater degree of certainty that the change in tone was the result of the event of interest as compared to other messages that do not have the key words related to the event of interest. Also, if the change in tone occurred relatively close to the time the event of interest occurred, then the decision analysis tool 124, 236 may be more certain that the event of interest caused the change in tone.

On the other hand, if the decision analysis tool 124, 236 does not detect a change in tone around the time that the event of interest occurred, then the decision analysis tool 124, 236 may generate a report indicating that no change has occurred (step 564). This may mean that employees did not have feelings about the event of interest or at least they have not expressed their emotions to show such feelings. After either report has been generated, the method returns back to step 504 to continue monitoring the communication system 100 for additional messages.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for determining the overall health of an enterprise. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of conducting a satisfaction survey, comprising:
   a processor determining an event of interest for an enterprise;
   the processor analyzing a first message generated by a user in order to determine a first tone of the user, wherein the first message is generated prior to the event of interest and is in temporal proximity to the event of interest;
   the processor analyzing a second message generated by the user in order to determine a second tone of the user, wherein the second message is generated after the event of interest and is in temporal proximity to the event of interest;
   the processor comparing the first tone of the user to the second tone of the user;
   based on the comparison, the processor determining a reaction of the user to the event of interest; and
   the processor associating results of determining the reaction with a user's level of satisfaction related to the event of interest.

2. The method of claim 1, wherein the event of interest comprises a policy decision for the enterprise and wherein the analysis of the message determines a reaction of the user to the policy decision.

3. The method of claim 1, wherein at least one of the following is true:
   (i) the first tone comprises a more positive tone than the second tone and wherein the reaction is determined to be a negative reaction to the event of interest;
   (ii) the first tone comprises a less positive tone than the second tone and wherein the reaction is determined to be a positive reaction to the event of interest; and
   (iii) the first tone and second tone are substantially the same and wherein the reaction is determined to be indifferent to the event of interest.

4. The method of claim 1, wherein a recipient of the first message is in a similar hierarchical position relative to the user as a recipient of the second message.

5. The method of claim 1, wherein at least one of the first and second tone of the user comprise at least one of neutral, anger, boredom, disgust, anxiety, happiness, and sadness.

6. The method of claim 1, further comprising:
   analyzing a plurality of messages from a plurality of users associated with the enterprise, wherein each of the plurality of messages are generated in temporal proximity to the event of interest;
   determining a tone of each of the plurality of messages;
   averaging the tone of the plurality of message; and
   determining a reaction of the enterprise to the event of interest.

7. A non-transitory computer readable medium comprising processor-executable instructions operable to perform a method for conducting a satisfaction survey, the instructions comprising:
   instructions to determine an event of interest for an enterprise;
   instructions to analyze a first message generated by a user in order to determine a first tone of the user, wherein the first message is generated prior to the event of interest and is in temporal proximity to the event of interest;

instructions to analyze a second message generated by the user in order to determine a second tone of the user, wherein the second message is generated after the event of interest and is in temporal proximity to the event of interest;

instructions to compare the first tone of the user to the second tone of the user;

based on the comparison, instructions to determine a reaction of the user to the event of interest; and instructions to associate results of the reaction determination with a user's level of satisfaction related to the event of interest.

8. A communication device, comprising:

a memory;

a processor in communication with the memory, the processor operable to execute a monitoring application, the monitoring application operable to:

determine when an event of interest occurred for an enterprise;

analyze a first message generated by a user in order to determine a first tone of the user, wherein the first message is generated prior to the event of interest and is in temporal proximity to the event of interest;

analyze a second message generated by the user in order to determine a second tone of the user, wherein the second message is generated after the event of interest and is in temporal proximity to the event of interest;

compare the first tone of the user to the second tone of the user;

based on the comparison, determine a reaction of the user to the event of interest; and associate results of determining the reaction with a user's level of satisfaction related to the event of interest.

9. The device of claim 8, wherein the second message is a predetermined amount of time after the event of interest.

10. The device of claim 9, wherein the first message is a predetermined amount of time before the event of interest.

11. The device of claim 8, wherein the first or second message comprises at least one of an email, a text message, an Instant Message, a voice message, and a real-time voice signal.

* * * * *